United States Patent [19]

Shigematsu

[11] Patent Number: 4,948,246

[45] Date of Patent: Aug. 14, 1990

[54] LEADING-VEHICLE DETECTION APPARATUS

[75] Inventor: Takashi Shigematsu, Mishima, Japan

[73] Assignee: Toyota Jidosha Kabushiki Kaisha, Toyota, Japan

[21] Appl. No.: 313,065

[22] Filed: Feb. 22, 1989

[30] Foreign Application Priority Data

Feb. 22, 1988 [JP] Japan .................................. 63-38895

[51] Int. Cl.$^5$ .............................................. G01C 3/08
[52] U.S. Cl. ........................................ 356/5; 342/128; 364/426.04
[58] Field of Search ...................... 356/5, 28; 342/192, 342/90, 70, 71, 72

[56] References Cited

U.S. PATENT DOCUMENTS

| 4,011,563 | 3/1987 | Robbi | 342/128 |
| 4,632,543 | 12/1986 | Endo | 356/5 |
| 4,757,450 | 7/1987 | Eton | 364/426.04 |

FOREIGN PATENT DOCUMENTS 61-40579 2/1986 Japan .

Primary Examiner—Charles T. Jordan
Assistant Examiner—Rochelle Lieberman
Attorney, Agent, or Firm—Kenyon & Kenyon

[57] ABSTRACT

The leading-vehicle detection apparatus, mounted on a sensing vehicle, radiates a laser beam from a transmitter of a laser radar. The laser beam is reflected by objects including any vehicle in front of the sensing vehicle, and is received by a receiver in the laser radar. The distances between the vehicle and the objects are calculated based on a comparison of the radiated laser beam and the reflected, received laser beam. The calculated distances are stored corresponding to the sweeping positions of the laser beam. Relative speeds between the vehicle and the objects are calculated from the variations over time in the distances. Based on the relative speeds, only the distance information for objects moving at almost the same speed as the sensing vehicle is selected. On the other hand, comparison patterns of inherent vehicular characteristics are stored beforehand. The selected distance information is compared with the comparison patterns. Information matching the comparison patterns is selected. Through this pattern-matching process, distance information for only the leading vehicle is quickly selected. Distance information for a guardrail, a center line, or other objects that are mistaken for moving objects is eliminated.

11 Claims, 14 Drawing Sheets

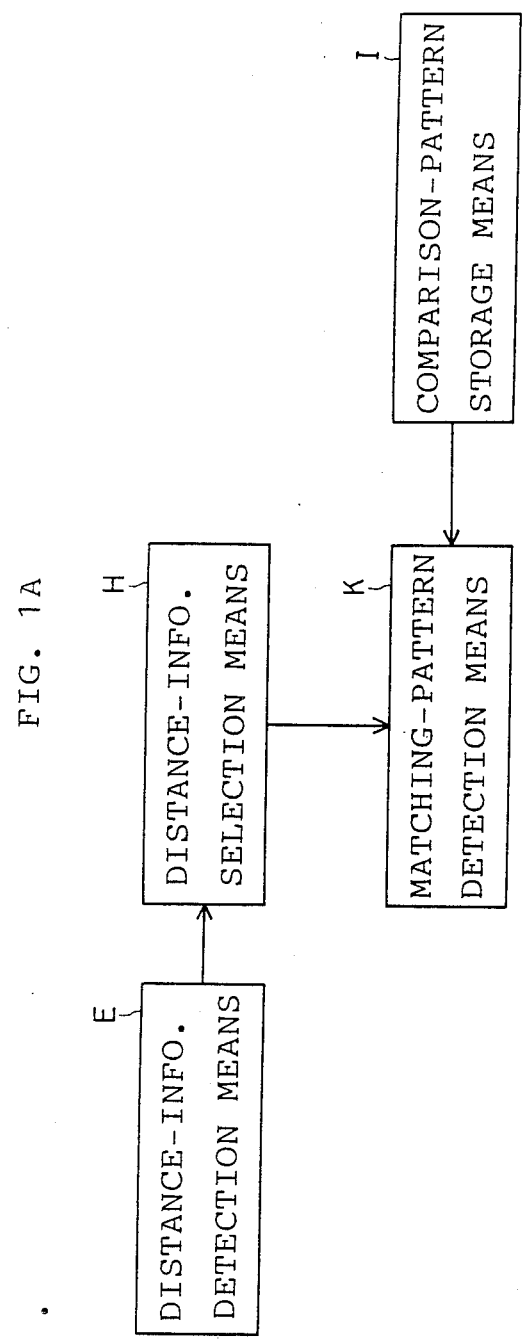

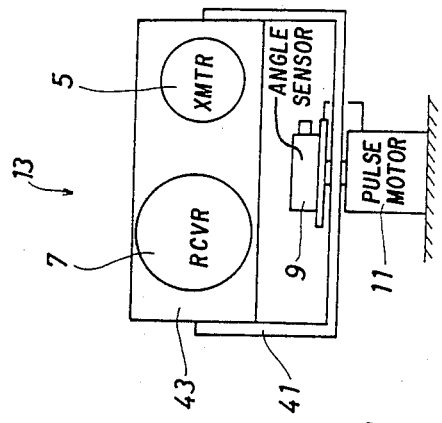
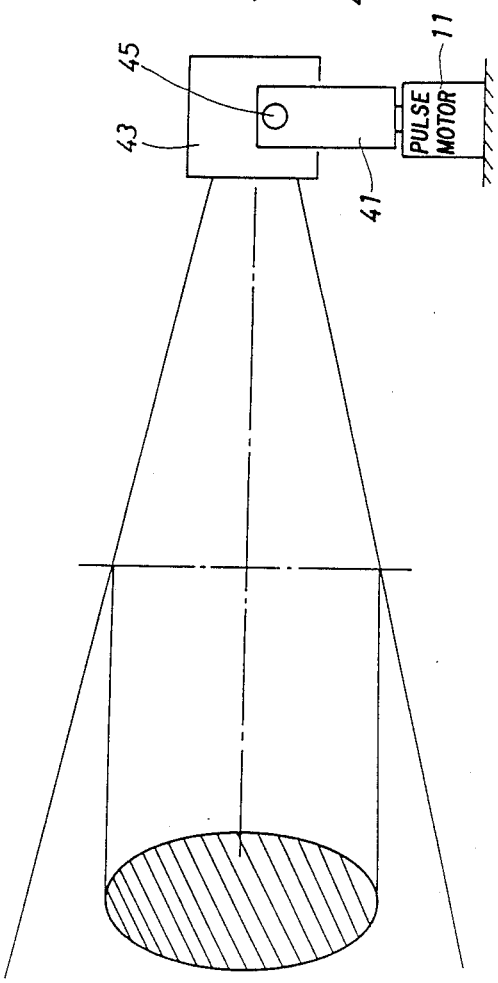
FIG. 3
FIG. 4

DISTANCE

DISTANCE

DISTANCE

SWEEPING POSITION

| SWEEPING POSITION | DISTANCE | TIME | DISTANCE | TIME | RELATIVE SPEED | RELATIVE DISTANCE |
|---|---|---|---|---|---|---|
| a1 | b1 | c1 | d1 | e1 | f1 | g1 |
| a2 | b2 | c2 | d2 | e2 | f2 | g2 |
| a3 | b3 | c3 | d3 | e3 | f3 | g3 |
| a4 | b4 | c4 | d4 | e4 | f4 | g4 |
| --- | --- | --- | --- | --- | --- | --- |
| STORAGE REGION | m1 | | m2 | | M2 | M3 |
| | M1 | | | | | |

LEADING-VEHICLE DETECTION APPARATUS

BACKGROUND OF THE INVENTION

This invention relates to a leading-vehicle detection apparatus that detects the distance and direction of a leading vehicle.

Prior-art leading-vehicle detection apparatuses detect the distance and direction of a leading vehicle or other objects, using a radar, an image sensor, etc. An auto-drive system has been proposed that operates an acceleration pedal based on detected distance and direction information. An auto-brake system has been also proposed that controls brakes based on the detected information.

The prior-art leading-vehicle detection apparatuses are classified into two systems: a passive system that detects obstacles by using an image sensor, and processes a picture of the detected data; and an active system that emits electromagnetic waves or laser beams forward and detects obstacles and their distances from signals reflected from the obstacles.

The passive system must process at least 10,000 units of data obtained from the image sensor. Its intricate processing circuit increases the processing time period, resulting in slow response.

On the other hand, the active system requires no intricate processing, so it has a quick response. However, a laser beam detects static objects, like a road or a guardrail as if they were moving objects like a vehicle.

To solve the problem of the active system, another leading-vehicle detection apparatus, disclosed in the Published Unexamined Patent Application No. S61-40579, addresses that problem in the active system. This prior-art apparatus emits electromagnetic waves to the rear part of the leading vehicle, which part is coated with wave-absorbing material, and distinguishes the leading vehicle from the auxiliary facilities of a road, an opposing vehicle, etc.

However, in this prior art, the leading vehicle must have a specific characteristic, i.e., a wave-absorbing coating on its rear. The prior-art apparatus can obtain information only from the leading vehicle having the specific characteristic on its rear.

SUMMARY OF THE INVENTION

One object of this invention is to precisely detect distance information about a leading vehicle by detecting the vehicle's inherent pattern and relative speed.

As shown in FIGS. 1A and 1B, this object is achieved by the present invention. The leading-vehicle detection apparatus mounted on a detecting vehicle to detect distance information about a leading vehicle, comprising: distance-information detection means E for detecting a distance between the detecting vehicle and leading objects according to time differences between wave transmission and reflected wave reception; distance-information selection means H for selecting detected-distance information for those leading objects whose speed relative to the detecting vehicle is less than or equal to a predetermined speed; comparison-pattern storage means I for storing vehicle inherent wave-reflection patterns as comparison patterns; and matching-pattern detection means K for comparing the distance information selected by the distance-information selection means H with the comparison patterns, and using the distance information matching the comparison patterns to determine the leading vehicle's position. The leading-vehicle detection apparatus mounted on a detecting vehicle to detect distance information about a leading vehicle, comprising laser radar means D comprising a transmitter A for radiating a laser beam, a receiver B for receiving the laser beam radiated from the transmitter A and reflected by objects, and a sweeping position detector C for detecting the sweeping position of the laser beam; distance-information detection means E for calculating distance information for the detecting vehicle about objects reflecting the laser beam, based on the laser beam radiated from the transmitter A and the reflected beam received by the receiver B; distance-information storage means F for storing the calculated distance information corresponding to the sweeping position; relative-speed detection means for detecting a relative speed between the detecting vehicle and objects reflecting the laser beam, based on time variations in the distance information; distance-information selection means H for selecting distance information about objects moving at almost the same speed as the detecting vehicle moves, based on the distance information and the relative speed; comparison-pattern storage means I for storing vehicle inherent wave-reflection patterns as comparison patterns; matching-pattern detection means K for comparing the comparison patterns with the distance information selected by the distance-information selection means H to detect the distance information that matches the comparison patterns; and output means L for receiving the distance information obtained by the pattern-matching means and for outputting distance and direction information about the leading vehicle.

The comparison pattern stored in the comparison-pattern storage means I should reflect the laser beam at a high reflection ratio, and should represent the vehicle's inherent characteristic like, for example, taillights or reflectors mounted on the rear part of vehicles. In addition, the basic pattern could include rear window glass, the vehicle's width or other characteristics affecting the reflection of the laser beam.

BRIEF DESCRIPTION OF THE DRAWINGS

The invention may be best understood by referring to the following description of the preferred embodiment of the invention and the drawings in which:

FIGS. 1A and 1B are block diagrams showing a basic structure of the embodiment;

FIG. 3 is a front view of a laser radar;

FIG. 4 is a side view of the laser radar;

DESCRIPTION OF THE PREFERRED EMBODIMENT

Figure 1B:
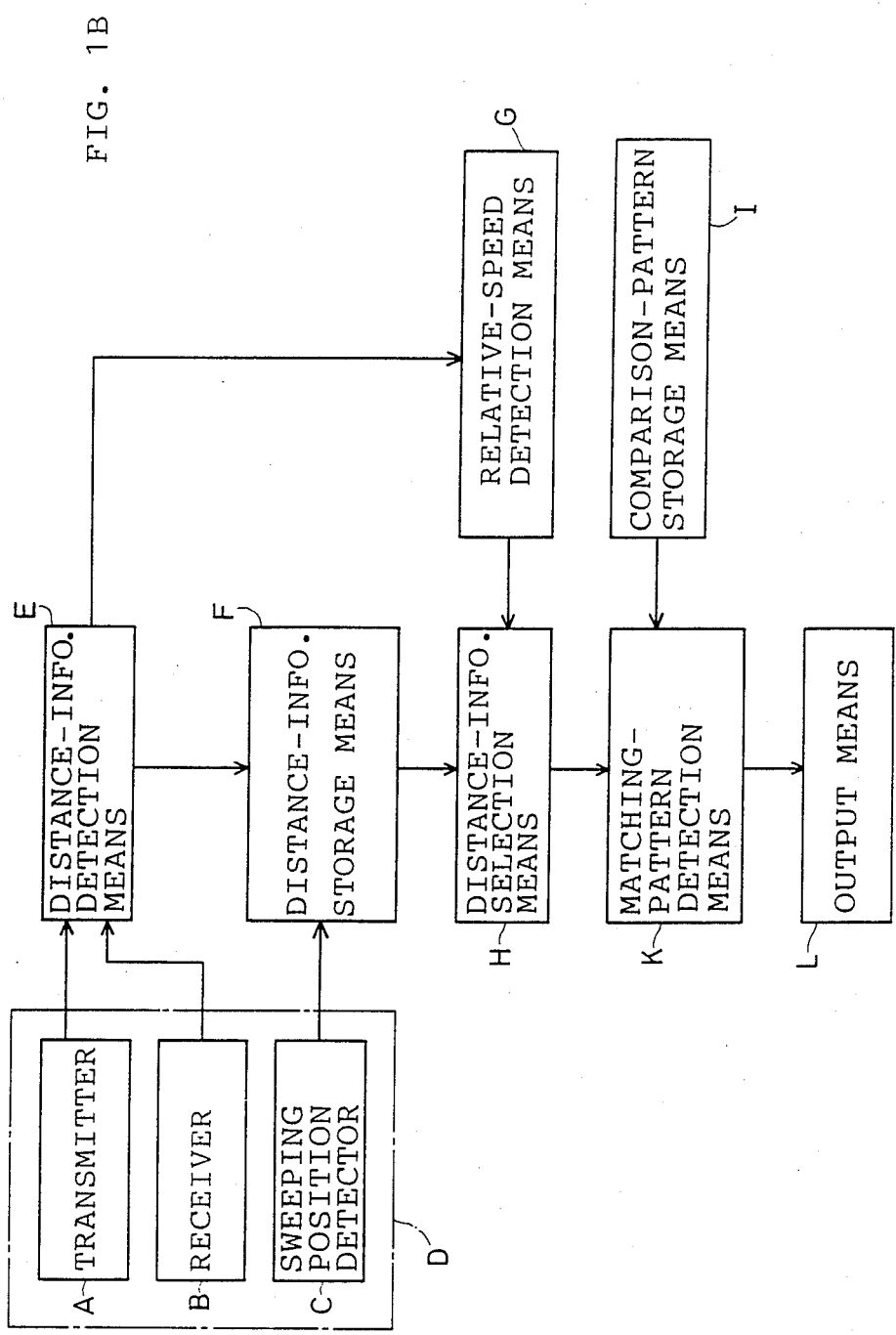

An embodiment of the present invention is now described referring to the drawings.

Figure 2:
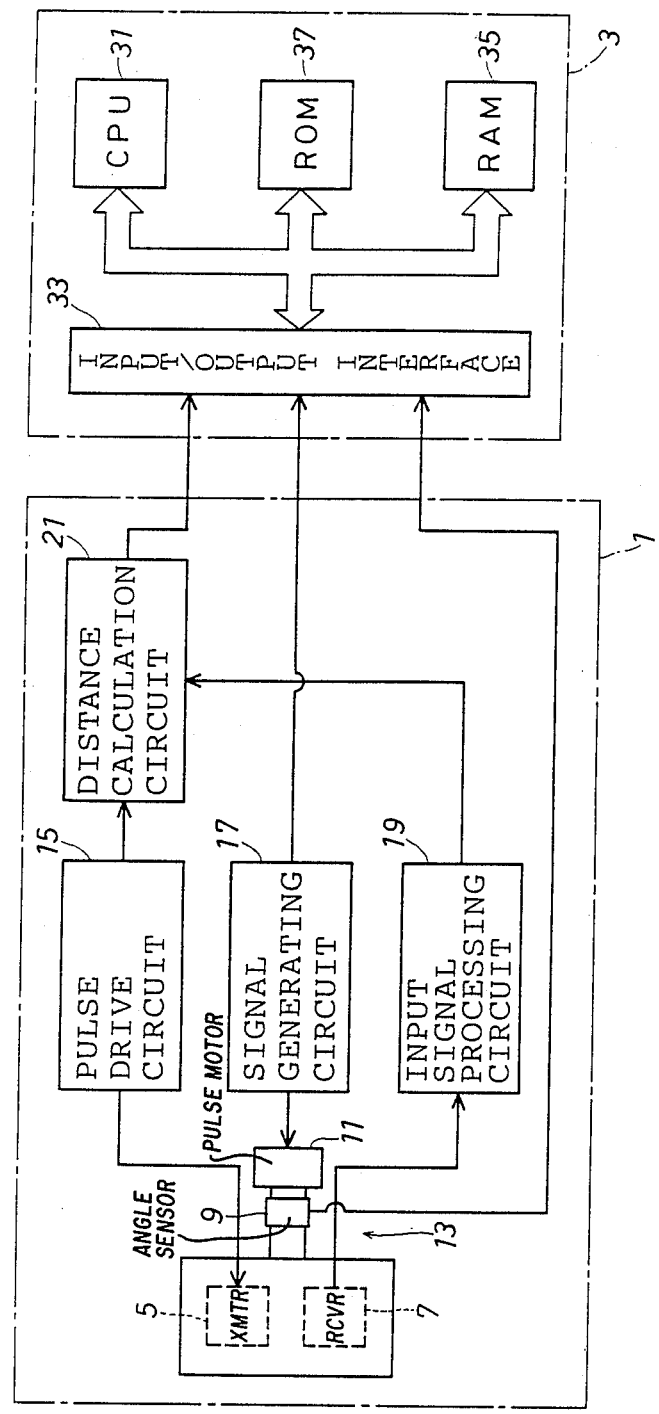
FIG. 2 is a circuit diagram for the embodiment.

As shown in FIG. 2, a leading-vehicle detection apparatus comprises a sensor 1 for detecting the distance between the vehicle where the apparatus is mounted and a vehicle, as well as other information, and a computer 3 for processing data signals transmitted from the sensor 1. The sensor 1 comprises a transmitter 5 and a receiver 7. The transmitter 5 and the receiver 7 compose a laser radar 13. A pulse motor 11 rotates the laser radar 13. An angle sensor 9 detects the rotating angle of the laser radar 13 for the feedback control of the laser radar 13. A pulse drive circuit 15 sends a drive signal to the transmitter 5. A signal generating circuit 17 sends a signal to scan the pulse motor 11. An input signal processing circuit 19 amplifies a signal received from the receiver 7, and shapes the waveform of the signal. Based on the signal from the input signal processing circuit 19 and the oscillating pulse signal from the pulse drive circuit 15, a distance calculation circuit 21 calculates the distances between the reflecting objects and the leading-vehicle detection apparatus.

The computer 3 receives signals from the distance calculation circuit 21, the signal generating circuit 17, and the angle sensor 9. In the computer 3, a CPU 31 processes data, an input/output interface 33 converts the signals received into digital signals that can be processed by the CPU 31, and converts the digital signals in the computer 3 into the signals that can be transmitted from the computer 3, a RAM 35 temporarily stores processed data, and a ROM 37 stores control-program instructions.

As shown in FIGS. 3 and 4, the laser radar 13 comprises a radar body 43 including the transmitter 5 and the receiver 7. The body 43 is mounted on a shaft 45 and is supported by a support arm 41. The support arm 41 is mounted on a rotating shaft of the pulse motor 11. The angle sensor 9, which is mounted on an output shaft of the pulse motor 11, detects the rotating angle of the radar body 43.

Figure 5:
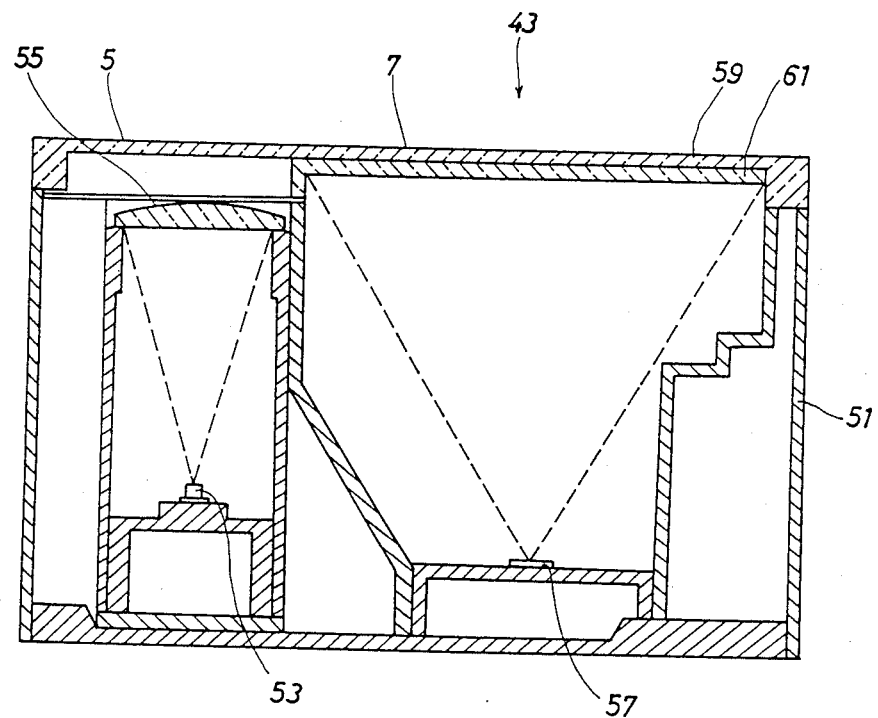
FIG. 5 is a sectional view of the laser radar.

As shown in FIG. 5, in the radar body 43, a case 51 houses the transmitter 5 and the receiver 7. The transmitter 5 has a laser diode 53 in the rear part of the case 51. The laser diode 53 emits a laser beam having a wave length of 0.85 to 1.2 μm. The laser diode 53 emits the laser beam through a half-cylindrical lens 55 where the configuration of the beam is changed to a longitudinal ellipse as shown in FIG. 4. The laser radar 13 rotates horizontally for scanning, and the area the laser beam irradiates forms a vertical ellipse. The horizontal laser beam thus reduces its scanning width, thus raising its detecting resolution. A wide range of information can be detected from the vertical ellipse.

The receiver 7 has a photo diode 57 in the rear part of the case 51, and an optical filter 59 and a converging lens 61 in the front part of the case 51.

As shown in FIG. 2, the laser radar 13, driven by the pulse motor 11, rotates by a predetermined angle, emits a laser beam from the laser diode 53 as a pulse signal having a predetermined frequency (e.g., 1 kHz to 10 kHz), transforms the emitted laser beam to a longitudinal elliptical beam through the half-cylindrical lens 55, and receives the laser beam reflected from the leading object through the optical filter 59 and the converging lens 61. Then, the reflected laser beam is received by the photo diode 57 where the laser beam is converted into an electrical signal.

Figure 6:
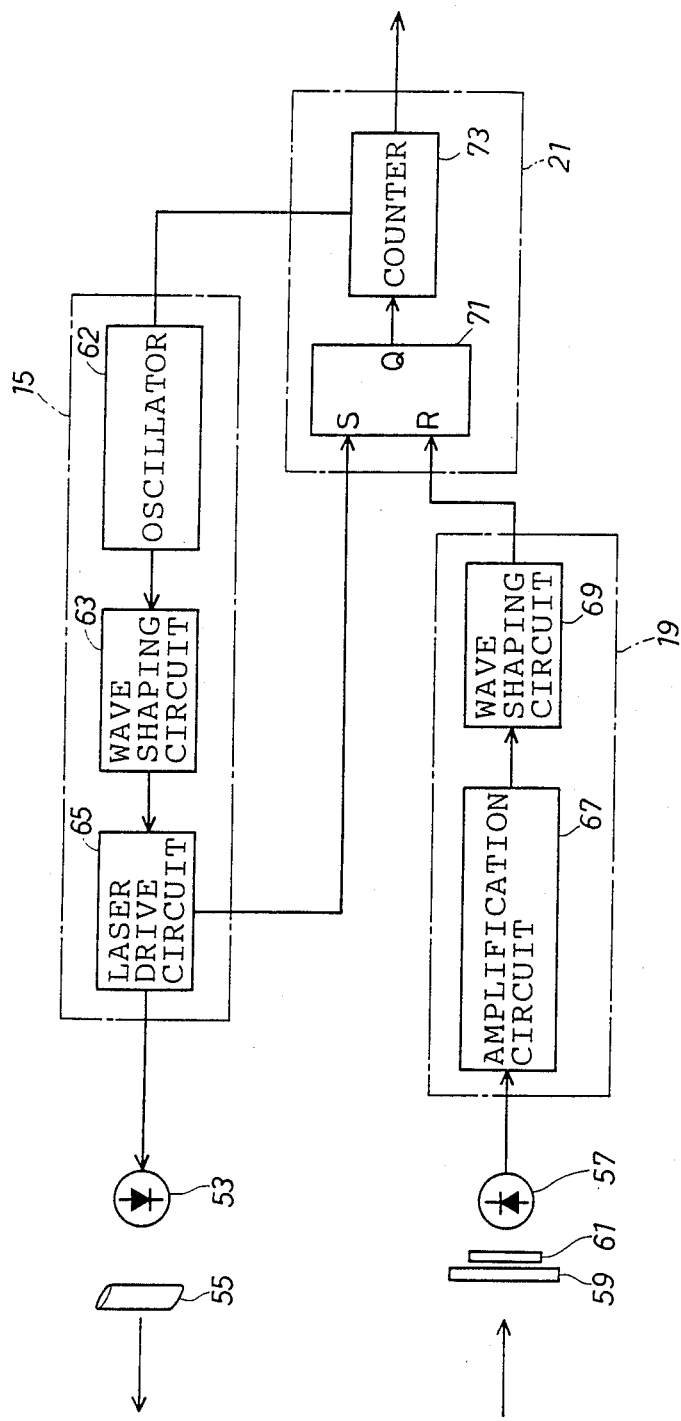
FIG. 6 is a circuit diagram for the laser radar.

The circuits shown in FIG. 6 drive and control the laser diode 53 and the photo diode 57. In the pulse drive circuit 15, an oscillator 62 generates a predetermined, oscillating pulse and a wave-shaping circuit 63 shapes the waveform of the generated pulse. A laser drive circuit 65 amplifies the pulse signal and transmits it to the laser diode 53, which emits a laser beam synchronized with the pulse signal.

The light reflected by the object goes through the optical filter 59 and the converging lens 61 to the photo diode 57, which converts the light into an electrical signal. Subsequently, the electrical signal is transmitted to an amplification circuit 67 in the input signal processing circuit 19. The signal amplified in the amplification circuit 67 is shaped in a wave shaping circuit 69, and transmitted to the reset terminal R of a flip-flop circuit 71. The set terminal S of the flip-flop circuit 71 receives the signal that synchronizes with the laser-beam emission signal transmitted from the laser drive circuit 65. After the set terminal S of the flip-flop circuit 71 receives a high level signal, an output terminal Q sends a high level signal to a counter 73 until the reset terminal R receives a high level signal. The counter 73 measures the time period between high-frequency signals received in response to the oscillating signal sent from the oscillator 62.

Based on the measured time period, the distance from the precursory object is calculated using the following formula:

L=C×n×Δt/2, where

L: distance from the object,

C: speed of light (m/sec), n: counted value,

Δt: time period of a pulse from the oscillator (sec).

The time period measured by the sensor 1 is sent to the computer 3 for processing data. The processing done in the computer 3 is now outlined using FIGS. 7A-7D.

Figure 7A:
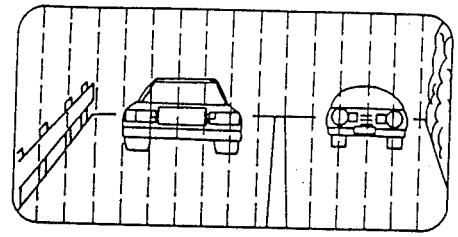
FIG. 7A is a front view from a vehicle equipped with the present embodiment.
Figure 7B:
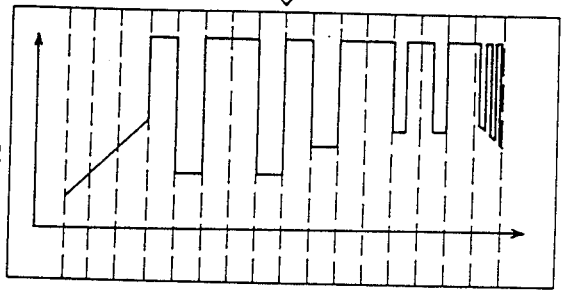
FIGS. 7B, 7C, and 7D are graphs resulting from processing of the view in FIG. 7A.

FIG. 7A illustrates a forward view from the vehicle on which the leading vehicle detection apparatus of the present embodiment is mounted. In the picture, a leading vehicle is driving up a rising road, on the other side of the road an oncoming vehicle is approaching, a guardrail is seen on the left side of the road, and a bank is seen on the right side of the road. The laser radar 13 rotates horizontally, radiates a laser beam, scans leading objects and obtains the distance from the objects. The laser beam actually sweeps two hundred to four hundred positions. Here, sweeping positions a-q are explained. The positions a-d include the guardrail, e-i the leading vehicle, j-k the center line, m-o the oncoming vehicle, and p-q the bank. The distance from these objects measured by the laser radar 13 varies with the incident angle between the laser beams and the objects. Normally, as shown in FIG. 7B, the distance information can be obtained based on the reflectance from the objects and the design specification of the laser radar 13. The distance information in FIG. 7B mapping the sweeping position to the distance is stored, and consecutively processed into the data shown in FIGS. 7C and 7D.

As shown in FIG. 7B, in the sweeping positions a–d, the guard rail is detected as a straight line where the distance from the guardrail gradually increases. Since the rear body of the leading vehicle does not reflect the laser beam intensely but two taillights (reflectors or the equivalent) mounted on the rear body reflect the laser beam intensely, two distances at the sweeping positions e–f and h–i can be detected, which distances equal each other. Since the center line continuously reflects the laser beam intensely, at the scanning positions j–k it is detected and distinguished from the rest of the road. The headlights of the oncoming vehicle reflect the laser beam intensely, and two pieces of information having the same distance can be detected at the scanning positions m–o. The bank is detected as unstable distance information due to its irregular reflection at the scanning positions p–q. As shown in FIG. 7B, the distance from the leading vehicle cannot be distinguished from that from the other objects. The information about the distance from the objects other than the leading vehicle is eliminated as unnecessary, and the information in FIG. 7B is changed into that of FIG. 7C. To eliminate unnecessary information from FIG. 7B, the relative speed between the reflecting objects and the vehicle with the leading-vehicle detection apparatus is detected from the ratio of distance variations over time. The detected speed of the static objects and the leading vehicle is almost the same as that of the vehicle on which the present embodiment is mounted. The speed of the opposing vehicle is greater than that of the sensing vehicle. Since the guardrail and the center line continuously reflect the laser beam with the same intensity, they are detected as being the objects moving at the same speed as the vehicle with the present embodiment mounted, even though they are static.

Figure 7C:
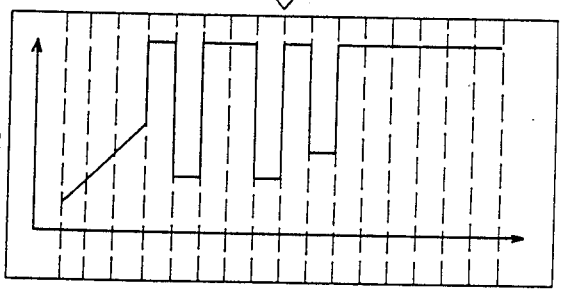

Only the distance information of the objects moving almost at the same speed as the vehicle with the present embodiment is selected from FIG. 7B to map FIG. 7C. For example, the distance information for the oncoming vehicle and the bank alongside the road (i.e., sweeping positions m–o and p–q) is eliminated because the detected speeds of these objects are far different from that of the vehicle with the present embodiment.

Figure 7D:
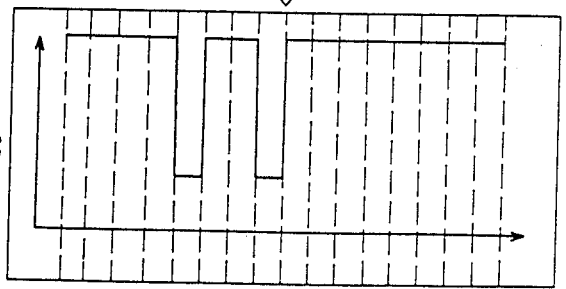

FIG. 7C includes the distance information for the guardrail and the center line in addition to the leading vehicle. To eliminate the distance information for the guardrail and the center line from FIG. 7C, the information is compared with basic patterns representing inherent vehicular characteristic. For example, since vehicles have the same distance between their two taillights, the distance between the taillights is stored as a basic pattern. A comparison pattern is formed by enlarging or reducing the basic pattern according to the distance from the reflecting objects. After the reflecting objects are compared with the comparison pattern, only the information for the objects that match with the basic pattern is selected from FIG. 7C. Consequently, as shown in FIG. 7D, the distance from and the position of the leading vehicle (i.e., sweeping positions e–f and h–i) can be obtained.

Figure 8:
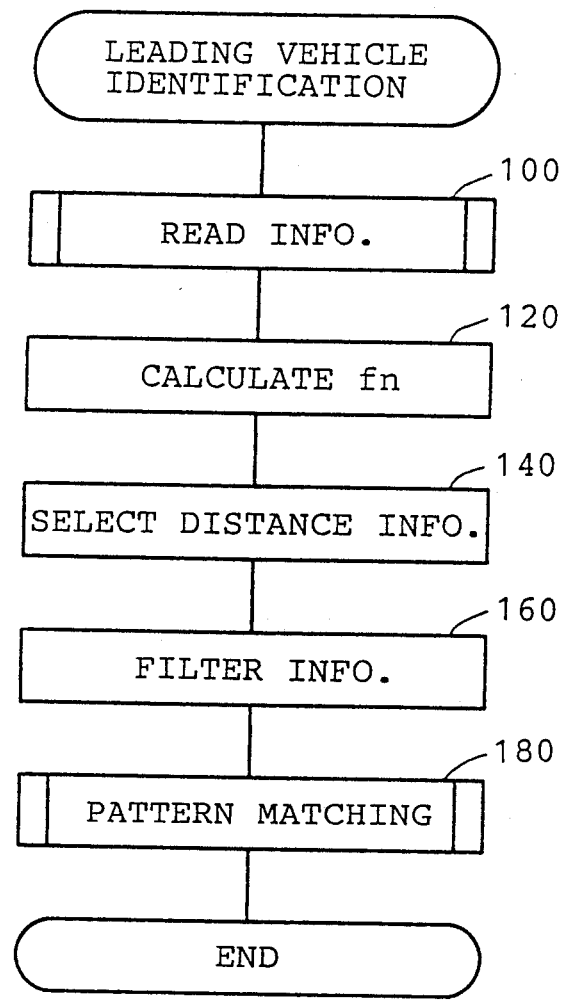
FIGS. 8, 9, and 10 are flowcharts of the processes executed in a computer in the embodiment.
Figure 9:
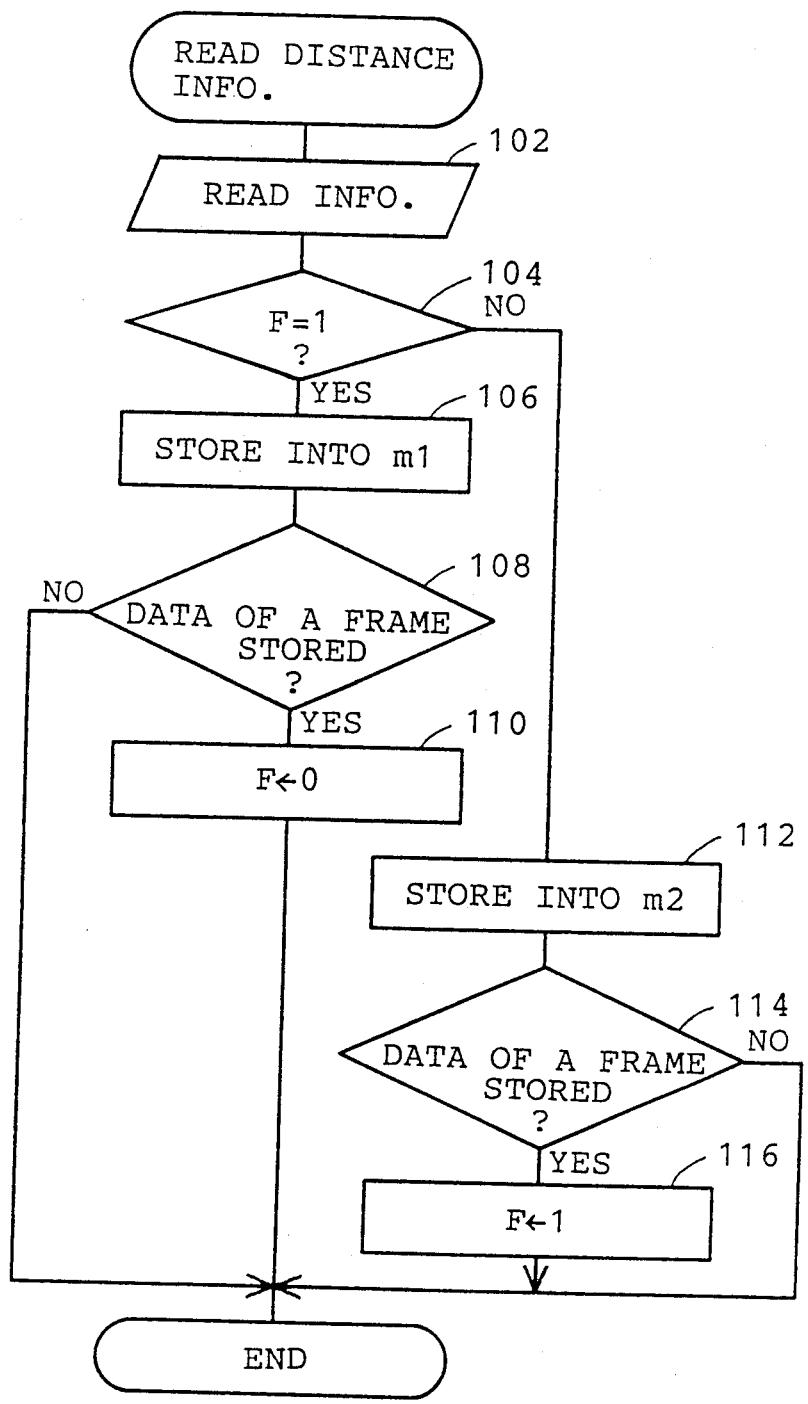
Figure 10:
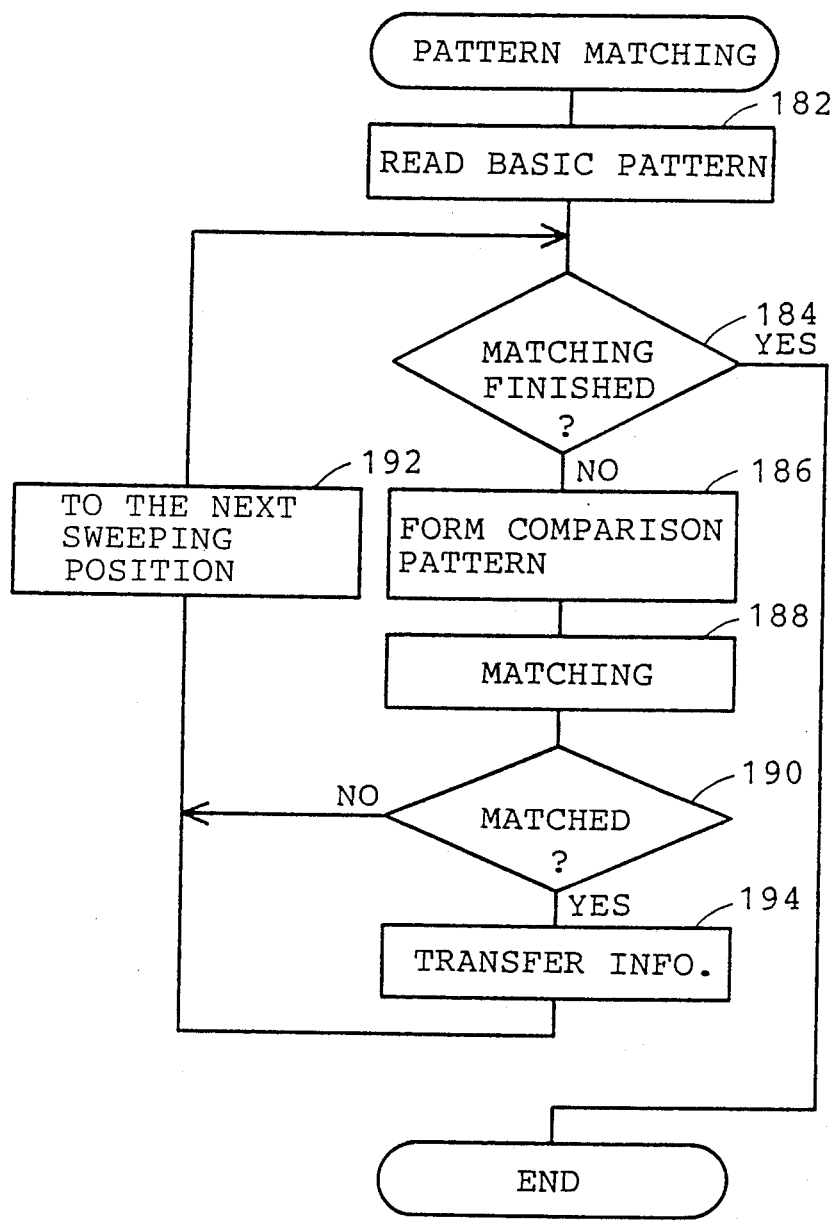

The processings executed in the computer 3 are now explained using the flowcharts of FIGS. 8–10.

In FIG. 8, step 100 first reads information from the counter 73 in FIG. 6. As shown in the flowchart of FIG. 9, distance information is read and stored in a predetermined storage region M1 including the storage regions m1 and m2 in FIG. 11. In FIG. 9, step 102 reads information from a scanned range, and step 104 determines whether a flag F is set at one. The flag F determines into which storage region, m1 or m2 the information should be stored. When the flag F is one, step 106 stores distance information (b1, b2 . . .) and time information (c1, c2 . . .) corresponding to sweeping positions (a1, a2 . . .) into the storage region m1. Subsequently, step 108 determines whether data of a frame, i.e., of all the sweeping positions, is stored or not. If the answer at step 108 is NO, the process once ends and is repeated from step 102. Alternatively, if the data of a frame is stored, the process goes to step 110 where the flag F is reset to zero. When the flag is not one at step 104, the process goes to step 112 where distance information (d1, d2 . . .) and the corresponding time (e1, e2 are stored into the storage region m2. Subsequently, step 114 determines that data of the frame is stored in the storage region m2, and step 116 sets the flag F to one. After the information of the frame is thus stored in the storage region m2, the information of the next frame is alternately stored in the storage region m1. Distance information is read and stored in this way.

Subsequently, as shown in FIG. 8, step 120 calculates relative speed fn based on variances with time in the information stored in the regions m1 and m2, using the following formula. The calculated relative speed is stored in the storage region M2.

fn=(d−b)/(e−c), where fn: relative speed, d: (n−1)th distance information, b: nth distance information, e: (n−1)th time information, c: nth time information.

Subsequently, step 140 selects only distance information gn of the leading objects whose detected speed is almost the same as that of the vehicle. Specifically, step 140 compares the relative speed fn with a predetermined value α, selects the sweeping positions that satisfy the formula $|fn| \leq α$, stores distance information (g1, g2 . . .) corresponding to the sweeping positions in the storage region M3, and converts the other information to constant N for storage.

Subsequently, step 160 filters distance information, using the following formula, to facilitate succeeding calculation by eliminating the variances in distance information.

$h_i = (xg_{i-1} + yg_i + zg_{i+1})/(x+y+z)$ $g_i$: distance information, x, y, z: weighted functions.

Figures 11, 12:
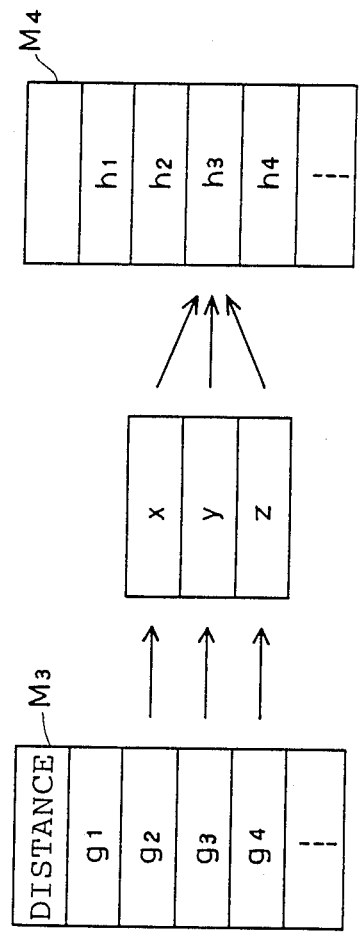
FIG. 11 illustrates information stored in storage regions.
FIG. 12 illustrates the process of filtering information.
Figure 14:
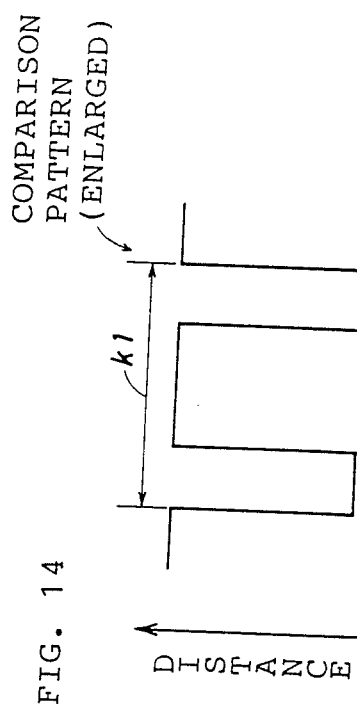
FIGS. 14 and 15 illustrate comparison patterns converted from the basic pattern.

As shown in FIG. 12, for example, averaged distance information h3 can be obtained from distance information g2–g4 and weighted functions x, y and z, using the above formula. Other distance information h4 . . . is sequentially calculated.

Figure 13:
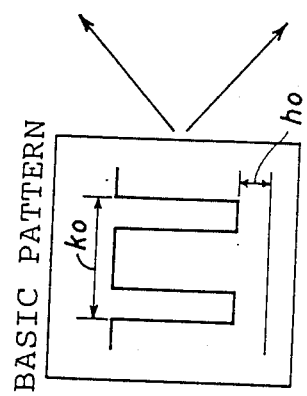
FIG. 13 illustrates a basic pattern for the rear of a leading vehicle.

Subsequently, step 180 matches patterns. The flowchart in FIG. 10 shows the process of pattern matching. First, step 182 in FIG. 10 reads the basic pattern (e.g., the taillights of the leading vehicle reflecting the laser beam). As shown in FIG. 13, the basic pattern has a predetermined width k0 and a predetermined distance h0. The width k0 denotes a predetermined width between the taillights mounted on the rear part of the leading vehicle, and the distance h0 denotes a predetermined distance from the rear of the leading vehicle. Subsequently, step 184 determines whether matching is finished or not. When the pattern matching is first executed, step 186 forms a comparison pattern by enlarging or reducing the basic pattern read at step 182 according to the sweeping position. Specifically, as shown in FIG.

Figure 15:
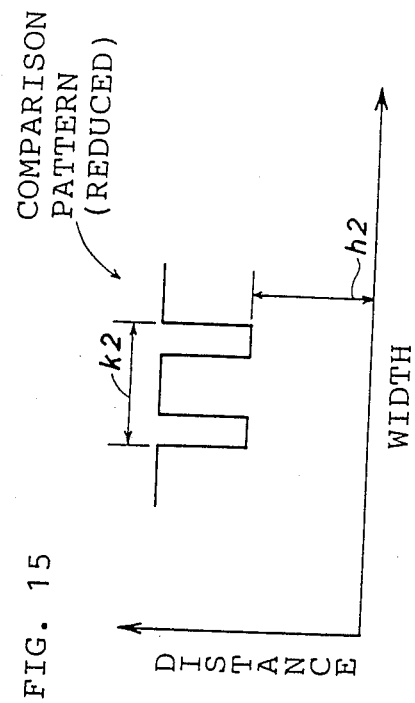

14, the width between the taillights is too wide when distance h0 is greater than h1, so the comparison pattern is obtained by enlarging the width k0 to k1. On the other hand as shown in FIG. 15, the width between the taillights is too narrow when the distance h0 is less than h2, so the comparison pattern is obtained by reducing the width k0 to k2.

Figure 16:
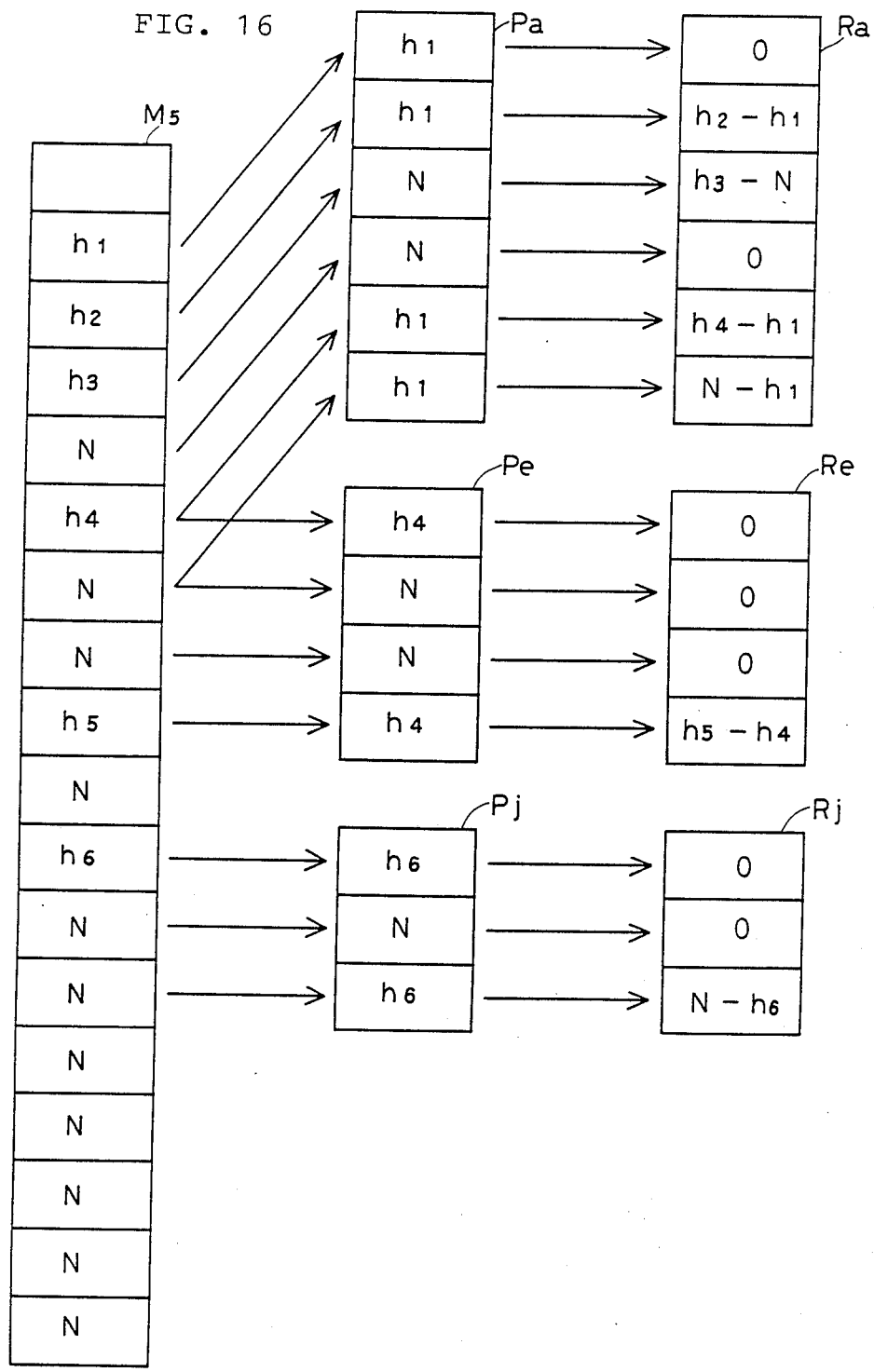
FIG. 16 illustrates stored distance information, a comparison pattern and comparison results.
Figure 17A:
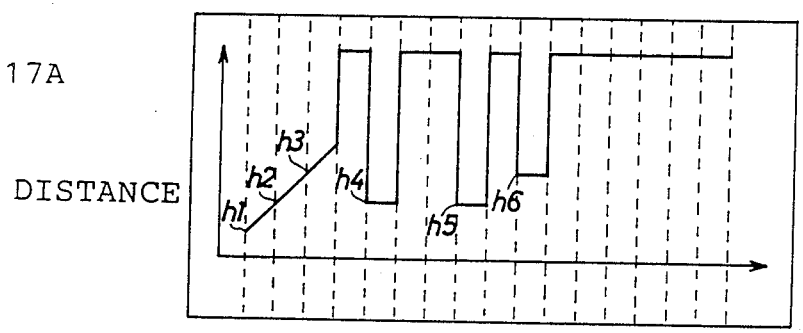
FIGS. 17A and 17B illustrate the processing of distance information.
Figure 17B:
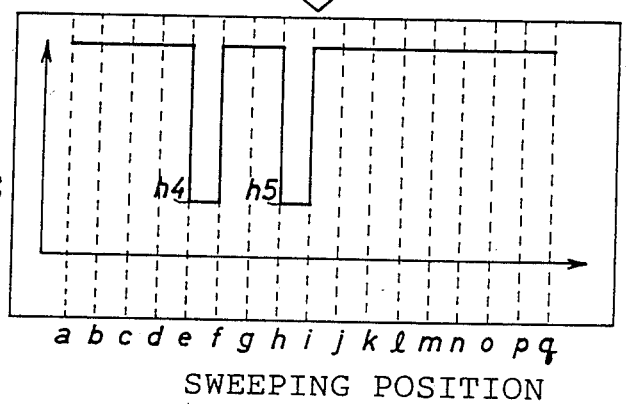

Subsequently, step 188 matches the comparison pattern to the information filtered at step 160 in FIG. 8. Specifically, as shown in FIG. 16, a storage region M5 stores the filtered information. Comparison patterns Pa, Pe and Pj, have distances h1, h4, h6, respectively, in the corresponding sweeping positions a, e, and j, as shown in FIGS. 17A and 17B. Results Ra, Re and Rj are the results of subtraction of the comparison pattern distance from the filtered distance information.

In the matching process, the distance information hn corresponding to the sweeping positions a–q of the comparison patterns Pa–Pq is subtracted from the filtered, stored distance information. If the subtraction results of any of Ra–Rq are all zero or near zero, the comparison pattern is considered matched. For example, the enlarged comparison pattern Pa corresponding to distance h1 is not matched, as seen from the results Ra. The comparison pattern Pe corresponding to distance h4 is matched as seen from the results Re, when the distance h4 equals the distance h5. The comparison pattern Pj having distance h6 is not matched as seen from the results Rj.

After matching is executed on the sweeping position a at step 188, step 190 determines that the comparison pattern of the sweeping position a is not matched, then step 192 shifts to the next sweeping position, consecutively from a to q. Subsequently, the process of steps 184 through 190 is repeated. On the other hand, when step 190 determines that the comparison pattern is matched, the process goes to step 194, which transfers the information (i.e., the distance and the direction) of the leading vehicle.

When step 184 determines that the matching of the comparison pattern in the sweeping positions a–q is finished, the process once ends and returns to the flowchart in FIG. 8, resuming the process.

In the embodiment of this invention, static objects such as the guardrail and the center line are not detected as moving objects. Only the distance and the direction of the leading vehicle can be accurately detected. This embodiment can be applied to all vehicles, because the rear part of the leading vehicle requires no wave-absorbing coating.

Unlike the passive method, this embodiment analyzes only the selected patterns, resulting in quicker response.

This embodiment uses a horizontally rotating laser radar 13 as a scanning mechanism. However, this embodiment can use as the scanning mechanism, for example, a compact, lightweight rotating mirror, an electro-optical deflector where irradiation of the light beam is deflected by applying voltage, an acoustic, optical deflector where irradiation of the light beam is deflected by ultrasonic waves.

This is only one possible embodiment of the invention claimed below. This embodiment is only an illustration of the claims, and in no way restricts the scope of the claims.

We claim:

1. A leading-vehicle detection apparatus mounted on a detecting vehicle to detect distance information about a leading vehicle where both the detecting vehicle and the leading vehicle are moving, the apparatus comprising:
   a transmitter for transmitting a series of waves and a receiver for receiving reflections of said transmitted waves from leading objects;
   distance-information detection means for detecting a distance between the detecting vehicle and the leading objects according to time differences between wave transmission by the transmitter and reflected wave reception by the receiver;
   distance-information selection means for selecting detected-distance information relating to those leading objects reflecting the transmitted wave which have a speed relative to the speed of the detecting vehicle that is less than or equal to a predetermined value;
   comparison-pattern storage means for storing vehicle inherent wave-reflection patterns as comparison patterns; and
   matching-pattern detection means for comparing the distance information selected by the distance-information selection means with the comparison patterns, and using the distance information matching the comparison patterns to determine the leading vehicle's position.

2. A leading-vehicle detection apparatus mounted on a detecting vehicle to detect distance information about a leading vehicle where both the detecting vehicle and the leading vehicle are moving, the apparatus comprising:
   laser radar means comprising a transmitter for radiating a laser beam, a receiver for receiving the laser beam radiated from the transmitter and reflected by objects, means for driving the laser beam in a sweeping pattern, and a sweeping position detector for detecting the sweeping position of the laser beam;
   distance-information detection means for calculating distance information for the detecting vehicle about objects reflecting the laser beam, based on the laser beam radiated from the transmitter and the reflected beam received by the receiver;
   distance-information storage means for storing the calculated distance information corresponding to the sweeping position of the laser beam;
   relative-speed detection means for detecting a relative speed between the detecting vehicle and objects reflecting the laser beam, based on time variations in the distance information;
   distance-information selection means for selecting distance information about objects moving at almost the same speed as the detecting vehicle moves, based on the distance information and the relative speed;
   comparison-pattern storage means for storing vehicle inherent wave-reflection patterns as comparison patterns;
   matching-pattern detection means for comparing comparison patterns with the distance information selected by the distance-information selection means to detect the distance information that matches the comparison patterns; and
   output means for receiving the distance information obtained by the matching-pattern detection means, and for outputting distance and direction information about the leading vehicle.

3. A leading-vehicle detection apparatus mounted on a detecting vehicle to detect distance information about a leading vehicle where both the detecting vehicle and the leading vehicle are moving, the apparatus comprising:

- laser radar means comprising a transmitter for radiating a laser beam, a receiver for receiving the laser beam radiated from the transmitter and reflected by objects, means for driving the laser beam in a sweeping pattern, and a sweeping position detector for detecting the sweeping position of the laser beam;
- distance-information calculation means for calculating the distance information for the detecting vehicle about objects reflecting the laser beam, based on the laser beam radiated from the transmitter and the reflected beam received by the receiver;
- distance-information storage means for storing the calculated distance information corresponding to the sweeping motion of the laser beam;
- relative-speed detection means for detecting a relative speed between the detecting vehicle and objects reflecting the laser beam, based on time variations in time of the distance information;
- distance-information selection means for selecting the distance information about objects moving at almost the same speed as the detecting vehicle moves, based on the distance information and the relative speed;
- comparison-pattern storage means for storing vehicle inherent wave-reflecting patterns as comparison patterns;
- pattern enlarging/reducing means for forming comparison patterns by enlarging or reducing the basic patterns corresponding to the distance information;
- matching-pattern detection means for comparing comparison patterns with the distance information selected by the distance-information selection means to match the distance information to the comparison patterns; and
- output means for receiving the distance information obtained by the matching-pattern detection means, and for outputting distance and direction information about the leading vehicle.

4. A leading-vehicle detection apparatus according to claim 2 or 3 in which the laser beam radiated from the transmitter of the laser radar horizontally sweeps a vertical, elliptical area.

5. A leading-vehicle detection apparatus according to claim 4 in which the means for driving the laser beam in a sweeping pattern is a pulse motor for rotating and driving the laser radar means to sweep the laser beam.

6. A leading-vehicle detection apparatus according to claim 2 or 3 in which the distance-information selection means includes filtering means for filtering the distance information selected by the distance-information selection means to eliminate the variations in distance information.

7. A leading-vehicle detection apparatus according to claim 6 in which the filtering means determines the distance information according to the formula:

$h_i = (Xg_{i-1} + yg_i + zg_{i+i})/(x+y+z)$, in which $g_i$ denotes distance information, and x, y, and z denote weighted functions.

8. A leading-vehicle detection apparatus according to claim 2 or 3 in which the distance-information selection means selects the distance information relating to those leading objects reflecting the laser beam which have a speed relative to the speed of the detecting vehicle that is less than or equal to a predetermined value.

9. A leading-vehicle detection apparatus according to claim 1, 2, or 3 in which the vehicle inherent wave-reflection pattern is obtained from a light beam reflected by taillights of the leading vehicle.

10. A leading-vehicle detection apparatus according to claim 2 or 3 in which the matching-pattern detection means includes subtraction means for subtracting the comparison patterns from the distance information and for determining if the difference is zero or substantially zero, thus finishing the pattern matching.

11. A leading-vehicle detection apparatus according to claim 3 in which the pattern enlarging/reducing means selects the comparison patterns enlarged of reduced based on the distance detected at a sweeping position of the laser beam, and the matching-pattern detection means matches patterns by determining whether subtraction signals of the detected-distance information and comparison patterns are equal to or less than a predetermined value.

* * * * *

UNITED STATES PATENT AND TRADEMARK OFFICE
CERTIFICATE OF CORRECTION

PATENT NO.   : 4,948,246
DATED        : August 14, 1990
INVENTOR(S)  : Takashi SHIGEMATSU It is certified that error appears in the above-identified patent and that said Letters Patent is hereby corrected as shown below:

Column 5, line 28 change: "same that" to --same as that--.

Column 5, line 49 change: "characteristic" to --characteristics--.

Column 10, line 16 change: "$(Xg_{i-1} + Yg_i + Zg_{i+i})$" to --$(Xg_{i-1} + Yg_i + Zg_{i+1})$--.

Column 10, line 37 change: "of" to --or--.

Signed and Sealed this

Twenty-fourth Day of December, 1991

Attest:

HARRY F. MANBECK, JR.

*Attesting Officer*    *Commissioner of Patents and Trademarks*